Patented Dec. 23, 1930

1,786,386

UNITED STATES PATENT OFFICE

EDGAR ARTHUR ASHCROFT, OF WAYE HOUSE, NEAR ASHBURTON, ENGLAND

EXTRACTION OF TIN FROM ORES OR MATERIALS CONTAINING TIN

No Drawing. Application filed May 4, 1928, Serial No. 275,267, and in Great Britain June 24, 1927.

This invention relates to improvements in the extraction of tin from ores, concentrates, residues or any material containing it and amenable to the treatment herein described.

It is useful in the extraction of tin from ores or concentrates containing it in the form of cassiterite such as the well known "lode tin" or "alluvial" ores which occur throughout the world, or of any form of concentrates therefrom.

My invention is characterized by the use of divided metals preferably iron or zinc powders as media for the reduction of the tin oxides to metal or to lower oxides.

I do not limit my invention to the use of the metals iron or zinc but may employ aluminium or magnesium or alloys such as iron and tin, nickel and tin, or nickel, iron and tin which are capable of acting as reducing agents as aforesaid and many metals are so capable.

In carrying my invention into effect I mix any of the aforesaid metal powders with any of the aforesaid materials and subject such mixtures to heat in any suitable furnace or retort under non-oxidizing conditions that is to say in a closed furnace, retort or container with exclusion of air or moisture or in a furnace with a wholly reducing atmosphere therein.

Reduction with iron is nearly complete at 600° centigrade, and is very rapid and complete at 900° centigrade which temperature should preferably not be exceeded as the charge according to this invention must not, in the case of iron, be sintered or slagged, which would be inconvenient in the subsequent operations of the process. In the case however of aluminium or magnesium powders the reaction is so strongly exothermic that a much higher temperature is reached and the gangue matter may be fused to a slag.

In the treatment of a rich material such as standard tin concentrates which are usually smelted and may contain 50 to 70 per cent tin with iron or zinc powders the mass should be stirred during or after the reduction. The greater part of the tin will then collect as metal leaving the iron, zinc or other metal oxide produced by the reaction and the gangue matter of the concentrate floating on the molten metal. The floating material may be gathered and in the case of iron may be reduced again to metal by heating it to about 500° centigrade more or less with coal and the reduced iron may be separated from gangue matter by magneting or otherwise and used again.

The reactions which take place in reducing cassiterite by means of metal powders may be empirically written thus (M standing for the reducing metal).

(1) Reducing $SnO_2$ to lower oxide
$$SnO_2 + M = SnO + MO$$
(2) Reducing $SnO_2$ to metallic tin
$$SnO_2 + 2M = Sn + 2MO$$
(3) Reducing SnO (or tin silicates) to metal $SnO + M = Sn + MO$ The use of metal powders in the aforesaid manner as reducing media has many advantages over the known methods of reduction by carbonaceous or gaseous reagents:—for instance a reduction of the carbonaceous fuel required in cyclic working, convenience of handling and absence of any emitted gases or products during reaction—except in the special cases.

When iron powder is the medium employed to reduce the cassiterite the produced iron oxide may be again reduced to metal either before or after separation from the gangue matter by means of solid or gaseous carbonaceous reducing agents. In cyclic working there is a considerable reduction of the ultimate reducing carbon required, in virtue of the fact that iron oxide may be readily reduced to metal by carbon at a temperature so low that $CO_2$ is the main product of the reaction whereas at the high temperature required to reduce cassiterite by carbon directly the product of reaction is mainly CO and therefore twice as much carbon is required.

Finely divided zinc—or blue powder—is also very efficient and under certain circumstances may be cheaply regenerated in the form of pure oxide and may be again comparatively cheaply converted to zinc powder in known ways. The use of zinc produces cleaner products and in some cases is preferable to any other metal.

Instead of adding iron or other reducing metal to the charge in metallic form I may (when suitable to this condition) add it in the form of oxide adding sufficient carbonaceous fuel to reduce the oxide to metal in situ, and in some cases I may greatly reduce the total amount of such metal present in the charge from that shown to be required by the aforesaid reactions, relying on the continual regeneration of the iron by mixing a sufficient amount of carbonaceous fuel with the charge. In such cases the action of the iron may be regarded as a catalytic action and the carbonaceous fuel as the principal reducing agent the efficiency of which is increased by such catalytic action I may employ such methods without departing from my invention.

After reduction of the tin oxide—or in some cases simultaneously therewith and especially when treating low grade materials from which the tin cannot be easily collected in molten form—I may proceed to recover the reduced tin in any convenient form by any of the several methods which are described in detail in my aforesaid co-pending applications or in any known or suitable way.

The metallic tin in such materials forms on reduction numerous globules which will vary in size according to the circumstances of reduction, one of which is the temperature employed in reduction. I have found that larger globules are formed at higher than at lower temperatures. I may therefore regulate the form of the reduced product in order to best suit it to the selected subsequent treatment by regulating the temperature of reduction.

Throughout this specification the terms ore or materials are intended whenever applicable by the context to include any ore concentrate product, slag or residue or other material from which tin is to be extracted. The terms furnace or retort are intended to include retorts, horizontal, sloping or vertical muffle or open furnaces with or without rabbling devices, revolving furnaces, kilns, tunnel ovens or any form of heating apparatus, the heat for which may be supplied by solid, liquid or gaseous fuel or by electricity.

Where the word "iron" is used in the claims, it is employed in a sense broad enough to include an alloy of which iron is a substantial part.

I do not confine my invention to the precise quantities or proportions of ingredients which I have indicated by way of example or illustration but may vary the same in any suitable manner and to suit any particular case without departing from the fundamental principles of my invention.

I am aware that carbonaceous and gaseous fuels have been frequently employed to reduce tin oxides both alone and in conjunction with various chlorinating agents such as chlorine or hydrochloric acid gas. I am also aware that zinc vapour at a high temperature has been used to reduce cassiterite in the assay of tin in ores I do not claim either of these reactions per se.

What I claim is:—

1. In the extraction of tin, the steps of reducing tin oxide by means of carbon and divided iron.

2. In the extraction of tin, the steps of reducing tin oxide by means of divided iron at not over 900° centigrade.

3. In the recovery of tin from material containing tin oxide, the steps of reducing tin by means of powdered iron at a temperature of not over 900° centigrade, and stirring the mass.

In testimony whereof I have signed my name to this specification.

EDGAR ARTHUR ASHCROFT.